May 31, 1955 C. S. BEYER ET AL 2,709,525
RETAINING PLATE AND SCREEN ASSEMBLY FOR CLARIFIERS
Filed Sept. 2, 1950 3 Sheets—Sheet 1
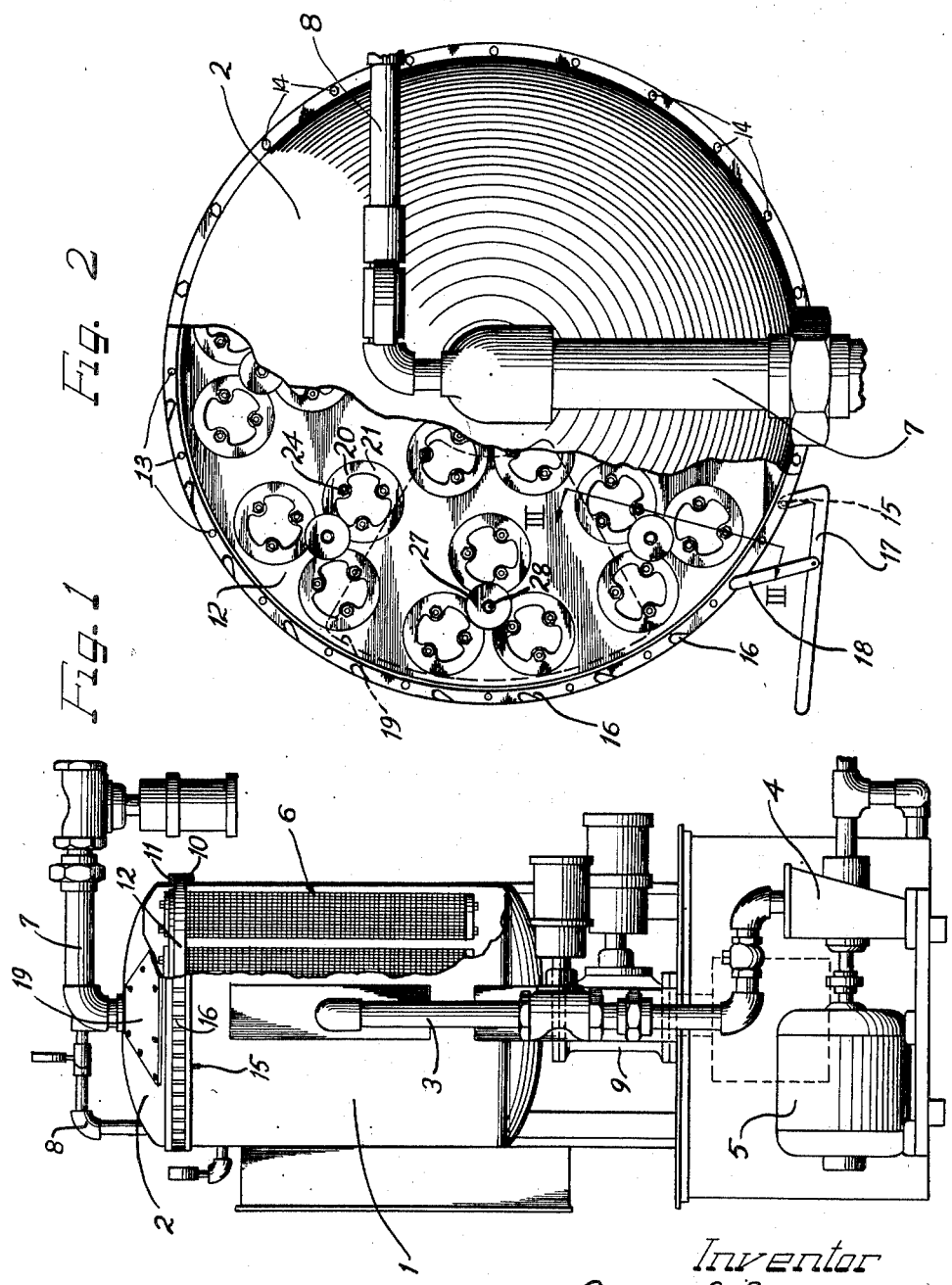
Inventor
CONRAD S. BEYER
JOHN J. KIMBRO

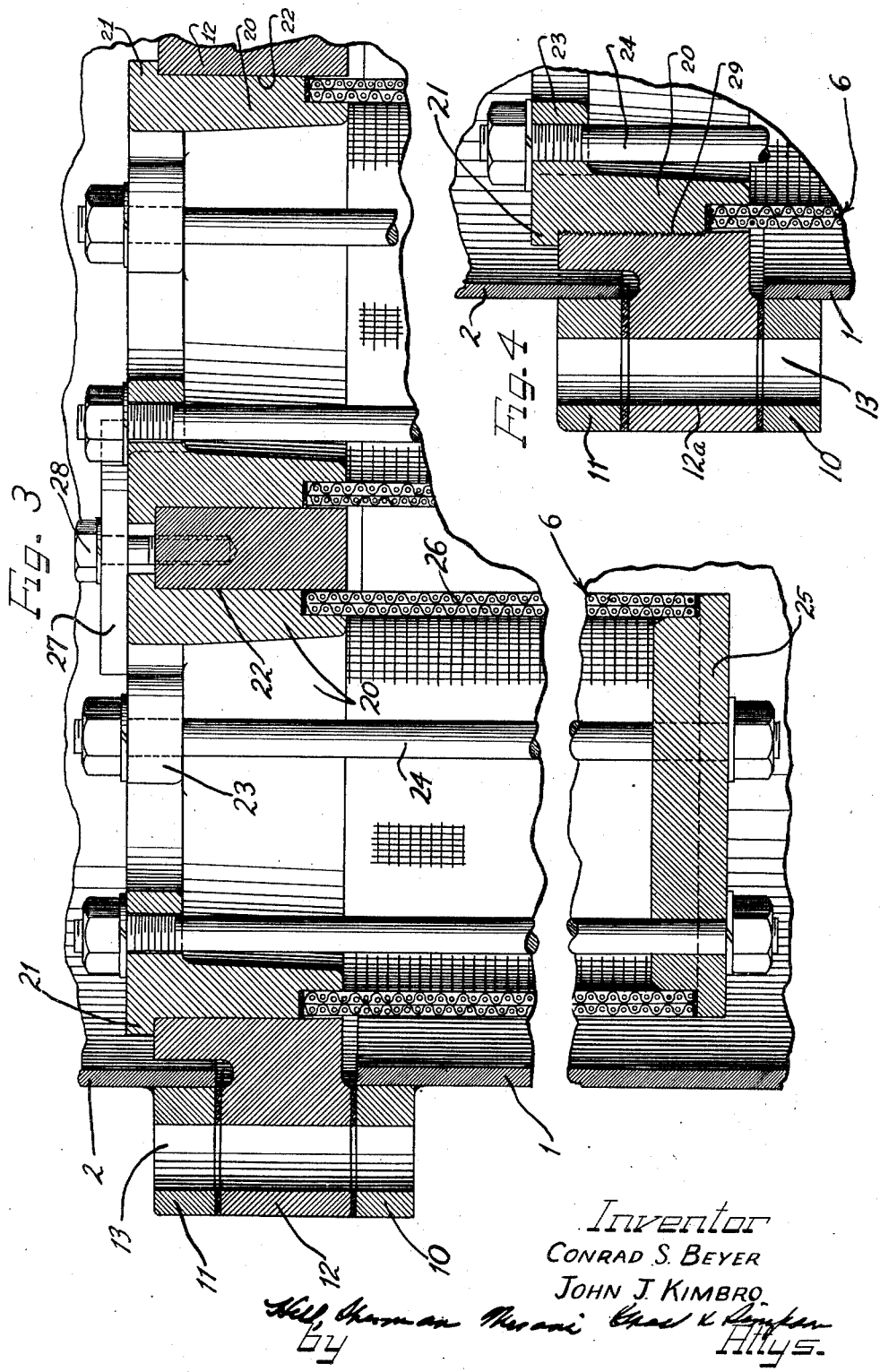

Inventors
CONRAD S. BEYER
JOHN J. KIMBRO

United States Patent Office 2,709,525
Patented May 31, 1955

2,709,525

RETAINING PLATE AND SCREEN ASSEMBLY FOR CLARIFIERS

Conrad S. Beyer and John James Kimbro, Lebanon, Ind., assignors to Houdaille-Hershey of Indiana, Inc., a corporation of Indiana Application September 2, 1950, Serial No. 183,015

4 Claims. (Cl. 210—184)

This invention relates to improvements in a retaining plates and screen assembly for clarifiers, and more particularly to a retaining plate and screen assembly for disposition inside a casing into which a liquid to be clarified is introduced under pressure and in which high pressures including blow-back or reverse pressure are involved, although the invention may have other uses and purposes as will be apparent to one skilled in the art.

In apparatus for clarifying fluids of the general character as that disclosed in H. H. Harms et al. Patent No. 2,366,903, issued January 9, 1945, a screen assembly embodying a retaining plate having numerous apertures therein with a clarifying screen depending from the plate adjacent each aperture has been frequently used. Such clarifying devices are desirable for removing abrasives, dirt, and other solid contamination from coolants used in grinding, broaching, boring, milling, and cutting machines of various types, etc., the object being to keep the coolant free from such deleterious matter and thus extend the life of the coolant through repeated use.

In clarifiers of this type, a casing was provided to which a cover was held by numerous bolts. The retaining plate and screen assembly was disposed inside the casing, and fluid under pressure was introduced into the casing, passing through the screens, and then through the outlet from the casing. At frequent intervals, by way of compressed air, fluid was driven through the casing in a reverse direction under pressure to cleanse the screens of accumulated matter and, in effect, to flush out the clarifying apparatus. Obviously, such construction necessitated considerable plumbing, and in order to get at the screen assembly to repair a defective screen, a great amount of that plumbing would have to be removed, and the entire cover taken from the casing. Heretofore, it was not possible to remove one screen from the retaining plate, but the entire plate would have to be removed with all of the screens attached thereto. This necessitated an objectionable amount of labor and expense for the mere repairing of a single screen, or for the inspection of the screens.

With the foregoing in mind, it is an important object of the instant invention to provide a retaining plate and screen assembly in a clarifier, whereby the screens may be readily removed individually from the plate, without removing the plate from the clarifier.

It is also an object of this invention to provide a clarifier arrangement having a plate and screen assembly therein, with a manhole or equivalent opening in the cover of the clarifier for ready inspection of the screens or for ready removal of individual screens through such manhole.

Still another object of the invention resides in the provision of a screen and plate assembly for use in a clarifier, by which the plate together with the screens carried thereby may be rotated when desired so as to bring different screens into position for ready access through a manhole in the clarifier, for purposes of inspection or replacement.

It is also a feature of this invention to provide a retaining plate and screen assembly, provided with means whereby the screens are readily and easily secured to the plate or removed therefrom as the case may be.

It is also a feature of this invention to provide a retaining plate and screen assembly, wherein each screen may be dropped through an opening in the plate, and simply detachable holding members secured to the plate between screens to overlie the collars of the screens and retain them in position.

It is also an object of this invention to provide a retaining plate and screen assembly for clarifiers, wherein the retaining plate together with the screens carried thereby may be rotated upon loosening of the clarifier cover, without the need of removing the cover from the clarifier, so that any screen may be easily inspected or removed through a manhole in the cover.

While some of the more salient features, characteristics and advantages of the instant invention have been above pointed out, others will become apparent from the following disclosures, taken in conjunction with the accompanying drawings, in which—

Figure 1 is an elevational view of a clarifier arrangement equipped with a retaining plate and screen assembly embodying principles of the instant invention, parts being broken away to show the interior structure;

Figure 2 is a plan view of the structure of Fig. 1, with parts broken away to show interior structure, and indicating the use of a suitable tool for rotating the retaining plate and screen assembly;

Figure 3 is a greatly enlarged fragmentary vertical sectional view, taken substantially as indicated by the line III—III of Fig. 2, looking in the direction of the arrows;

Figure 4 is a fragmentary vertical sectional view similar in character to Fig. 3, but illustrating a modified form of construction;

As shown on the drawings:

Figure 5:
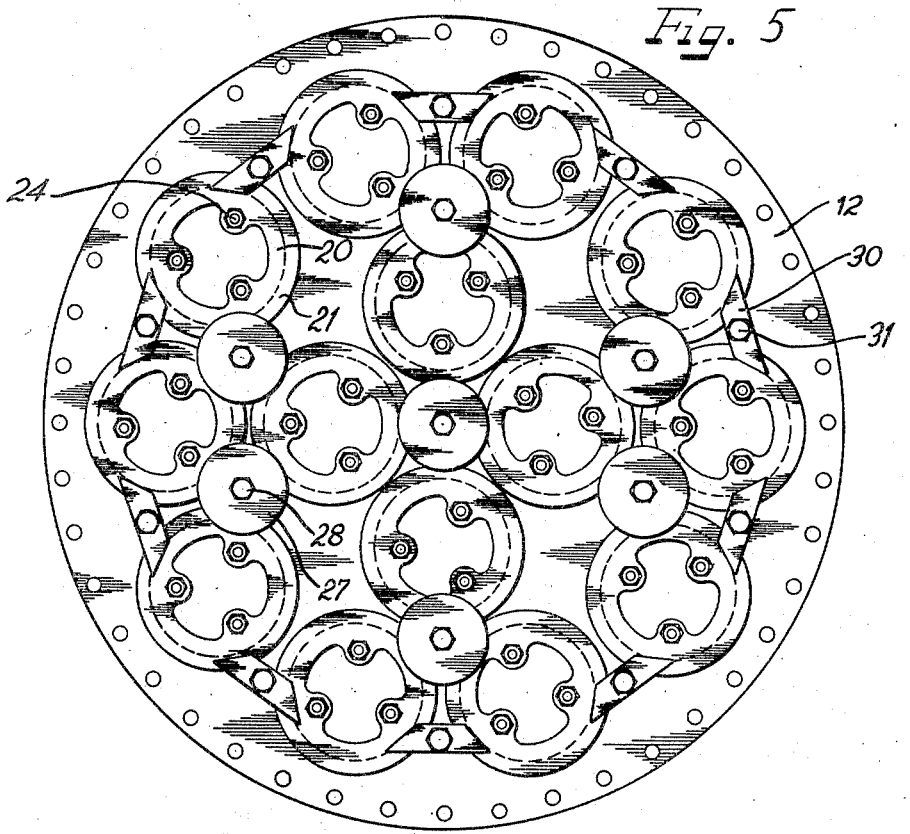
Figure 5 is a plan view of a retaining plate and screen assembly showing a somewhat different arrangement of screen holding members from that seen in Fig. 2.

With reference more particularly to Fig. 1, it will be seen that we have illustrated a clarifying apparatus including a tank or casing 1 having a removable cover 2 and into which fluid to be filtered or clarified may be pumped through a pipe 3 by pump 4 actuated by any suitable power unit such as an electric motor 5. Inside the housing is a plurality of filter screens, generally indicated by numeral 6, and the fluid passes inwardly through these screens, exits through the top thereof, and leaves the housing through an outlet pipe 7 connected through the cover 2. A pipe 8 connected to any suitable source of air pressure also enters the outlet pipe 7 adjacent its opening into the casing, and periodically and automatically compressed air is discharged into the casing to create a blow-back pressure reversely through the screens or filter unit to remove the accumulation from the exterior of these units, which accumulation together with contaminated fluid is discharged out the bottom of the housing through a blow-down pipe 9. During the blow-down operation, of course, suitable valves, not shown, cut off the inlet pipe 3 and the outlet pipe 7.

The casing 1 is provided with a flange 10 around the mouth thereof as best seen in Fig. 3, and the cover 2 is provided with a similar outstanding flange 11 around the lower end thereof. A retaining plate 12 projects between these flanges, and the flanges as well as the retaining plate are provided with numerous apertures for aligned disposition to provide bolt holes 13, accommodating bolts 14 by means of which the cover is attached to the casing and the retaining or screen supporting plate 12 is anchored therebetween. Suitable packing elements, as indicated in Fig. 3, may be disposed between the plate in the cover engaging flanges, if so desired.

Depending from the underside of the casing flange 10 are several spaced pins 15, and the retaining plate 12 is provided with numerous notches 16 in its circumferential edge, these pins and notches providing engagement means for a suitable tool, diagrammatically illustrated in Fig. 2, that may be used for rotating the retaining plate together with the screens carried thereby. Of course, before such rotation is possible all the bolts 14 must be removed. A simple form of tool may be utilized to rotate the retaining plate 12, such as a device comprising a bell crank lever 17 having an opening in one end thereof for engagement over one of the pins 15, and an arm 18 pivoted to the long arm of the bell crank lever, the free end of which may be engaged in one of the notches 16 in the circumferential edge of the retaining plate 12. With the device mounted as illustrated in Fig. 2, a movement of the free end of the bell crank lever toward the casing will cause a rotation of the retaining plate.

In this manner, the screens may be successfully brought into register with a manhole in the cover 2 normally closed by a suitable cover 19 bolted to the cover 2 as seen in Fig. 1, the manhole being indicated by dotted lines in Fig. 2 to show certain of the screens in registry therewith. Thus, the screens may be individually inspected or removed singly or in twos or threes, without the need of removing the cover 2 from the casing together with all the plumbing associated with that cover. The simple removal of the bolts 14 and the manhole cover is all that is necessary to provide free and easy inspection or replacement of the screens 6.

The structure of each of the screens 6 is more fully disclosed, described, and claimed in our copending application for patent entitled Filter Screen Assembly, filed August 16, 1950, Serial No. 179,864.

Briefly, each of these screens embodies a cylindrical collar 20 having an outwardly extending flange 21 at the top thereof. The outer wall of the collar is preferably smooth so that the collar may be dropped through an aperture 22 in the retaining plate 12, with the flange resting upon the top of the plate and supporting the entire screen or filter unit 6. A plurality of apertured bosses or lugs 23 extend inwardly from the collar 20, and an elongated bolt 24 extends through each of these lugs and downwardly through a bottom plate 25 which is solid except for the bolt apertures. Between this bottom plate 25 and the collar 20 is a fine mesh screen 26, preferably in the form of a cylinder, which may satisfactorily be of Dutch weave wire cloth of Monel metal or similar rust resistant material, clamped firmly in position by the tightening of the bolts 24. With this structure, it will be noted that any pressure on the bottom plate 25 by virtue of blow-back pressure in the clarifier is transferred back to the retaining plate 12.

Embodied in this invention are simplified retaining means for holding the screens tightly in association with the retaining plate 12 against blow-back pressure. To this end, referring more particularly to Fig. 2, wherein the screens are grouped in threes, a simple circular plate 27 may be bolted to the plate between the screens as indicated at 28. This holding plate 27 overlies a part of the collars 20 of three adjacent screens, thus holding them firmly in place in the plate 12. It is a simple expedient to reach through the manhole in the cover 2, remove a bolt 28 and the associated holding member 27, and three screens are at once freed for individual removal and replacement.

With the aid of the tool above described, the plate may be rotated to bring other screens into a position accessible through the manhole.

In Fig. 4 we have indicated another method of anchoring the screens or filter units 6 to a retaining plate, indicated by numeral 12a in this showing. In this arrangement, a collar 20a of the screen assembly is externally threaded, and the opening in the plate 12a is internally threaded as indicated at 29, so that each individual screen or filter unit may be threaded into the corresponding opening in the retaining plate. In this manner the screen units will obviously be firmly retained in the plate against blow-back pressure, but the structure of Fig. 4 is not as expeditious in operation as that described in connection with Figs. 2 and 3.

Under certain circumstances, and especially where extra high pressure is utilized in the casing, it may be desirable to provide additional holding elements in order that each screen collar 20 is engaged by more than one holding element. To this end, an arrangement may be provided such as is illustrated in Fig. 5. In this arrangement, in addition to the disc-like holding members 27 above described, polygonal holding members 30 may be provided adjacent the outer rim of the outside screen circle. These elements may each be held in place by a single bolt 31 engaged in the plate between adjacent screen apertures. It will be noted that each element 30 overlies a portion of the collar on two screens, so that every screen is engaged by a holding element at least twice and in different locations. The use of polygonal elements of the character of the holding members 30 is also sometimes desirable adjacent the rim of the retaining plate 12 in order to permit an easy and accurate seating of the cover 2 on the retaining plate without any possibility of interference from the holding element.

Figure 6:
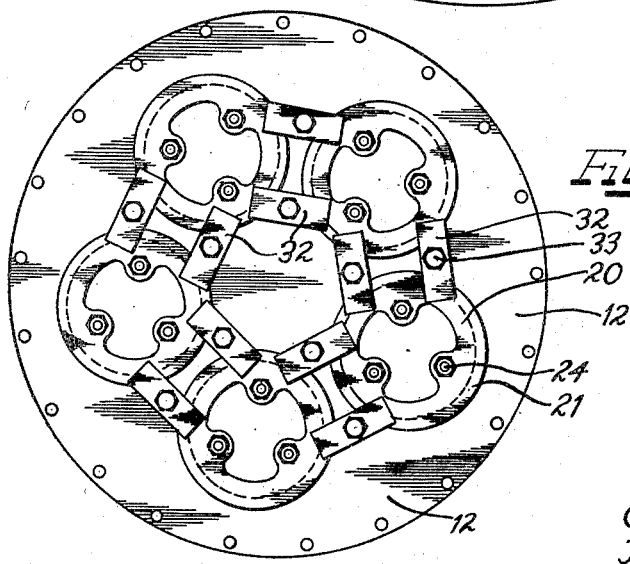
Figure 6 is a view similar in character to Fig. 5 but showing a still different arrangement of screen holding elements.

Still another arrangement of the holding element is illustrated in Fig. 6, wherein rectangular elements 32 are provided each of which is held in place by a bolt 33. These elements are desirable for use, especially where there is a single circle of screens, and where very high pressure may be employed in the casing. An inner circle of holding elements and an outer circle of holding elements are provided, so that each screen collar is engaged at four different points by the holding element and thus firmly held in place against any pressure that may be developed in the casing under ordinary circumstances, and even against ultra high pressures.

From the foregoing, it is apparent that we have provided a novel retaining plate and screen assembly for clarifiers, wherein the screen or filter units are readily and easily individually inspected, removed, and replaced. In addition, it will be noted that the entire arrangement is extremely durable, and economical to manufacture and use.

It will be understood that modifications and variations may be effected without departing from the scope of the novel concepts of the present invention.

We claim as our invention:

1. In a clarifier, an open-topped stationary casing, a flange around the mouth of said casing, a normally stationary plate seated on said flange and extending across said casing, screen units depending from said plate into said casing, a stationary cover having a manhole therein seated on the rim of said plate, securing means engaging said cover and said flange to clamp said plate therebetween, and said plate and said flange having means for engagement by a tool to rotate said plate relatively to said casing and cover to successively bring screen units into registry with said manhole when said securing means are released.

2. In a clarifier, an open-topped stationary casing, a flange around the mouth of said casing, a normally stationary plate seated on said flange and extending across said casing, screen units depending from said plate into said casing, a stationary cover having a manhole therein, a flange on said cover seated in the rim of said plate, securing means engaging said flanges to clamp said plate therebetween, a pin projecting from one of said flanges, and said plate having notches in the edge thereof, whereby a tool may engage said pin and a notch to rotate said plate when said securing means are released and bring said units into registry with said manhole.

3. In a fluid clarifier, an open-topped stationary casing, a cover therefor having a manhole therein, a removable cover over said manhole, a plate having apertures therein seated between the top of said casing and said casing cover, removable means locking the cover to the tank with the plate therebetween, a filter unit having a flanged collar seated in each of said apertures, a plurality of holding elements removably secured to said plate with each element overlying the flange of a plurality of said filter units to maintain the units in firm contact with the plate, and said plate being rotatable relatively to said casing cover when said locking means are removed to successively bring said holding elements into register with said manhole.

4. In apparatus of the character described, a stationary casing, a removable but normally stationary cover therefor, said cover having a manhole therein, a removable and normally stationary plate held between said casing and cover, securing means to join said cover to said casing with said plate therebetween, said plate having apertures therein, a filter screen depending through each said aperture, means removably holding each screen to said plate, said plate being rotatable relatively to said casing and said cover when said securing means are released to bring any filter screen into registry with said manhole, and said plate and screens being entirely removable from the casing when the cover is removed to provide access to the interior of said casing.

References Cited in the file of this patent
UNITED STATES PATENTS

| Number | Name | Date |
|---|---|---|
| 231,066 | Long | Aug. 10, 1880 |
| 619,569 | Hewel | Feb. 14, 1899 |
| 772,389 | Webb | Oct. 18, 1904 |
| 1,103,531 | Niclausse | July 14, 1914 |
| 1,415,217 | Brock | May 9, 1922 |
| 1,823,171 | Hele-Shaw et al. | Sept. 15, 1931 |
| 1,992,101 | Stuart | Feb. 19, 1935 |
| 2,374,976 | Briggs et al. | May 1, 1945 |
| 2,462,509 | Kobbe | Feb. 22, 1949 |
| 2,498,145 | Tinker | Feb. 21, 1950 |
| 2,523,793 | Vance | Sept. 26, 1950 |
| 2,533,762 | Brugmann | Dec. 12, 1950 |
| 2,562,730 | Miller, Jr. | July 31, 1951 |
| 2,617,986 | Miller | Nov. 11, 1952 |